US008857176B2

(12) United States Patent
Takahashi et al.

(10) Patent No.: US 8,857,176 B2
(45) Date of Patent: Oct. 14, 2014

(54) ENGINE

(75) Inventors: Takeshi Takahashi, Osaka (JP); Hidenori Nomura, Osaka (JP); Kazuki Maetani, Osaka (JP); Terumitsu Takahata, Osaka (JP); Takao Kawabe, Osaka (JP); Kazuhiro Takenaka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 455 days.

(21) Appl. No.: 13/123,126

(22) PCT Filed: Sep. 17, 2009

(86) PCT No.: PCT/JP2009/066247
§ 371 (c)(1),
(2), (4) Date: Apr. 21, 2011

(87) PCT Pub. No.: WO2010/041545
PCT Pub. Date: Apr. 15, 2010

(65) Prior Publication Data
US 2011/0192160 A1  Aug. 11, 2011

(30) Foreign Application Priority Data
Oct. 7, 2008 (JP) .................... 2008-260867

(51) Int. Cl.
*F02B 37/12*  (2006.01)
*F02B 37/00*  (2006.01)
(Continued)

(52) U.S. Cl.
CPC ............. *F02D 23/00* (2013.01); *Y02T 10/144* (2013.01); *F02B 37/001* (2013.01); *F02D 41/0007* (2013.01); *F02B 37/22* (2013.01); *F02D 2200/0406* (2013.01); *F02B 37/007* (2013.01); *F02B 37/24* (2013.01); *F02B 37/18* (2013.01); *F02B 2037/122* (2013.01)
USPC .............................................. 60/600; 60/611

(58) Field of Classification Search
USPC ............. 60/600, 611, 612, 605.1, 602, 605.2
See application file for complete search history.

(56) References Cited

U.S. PATENT DOCUMENTS 4,556,038 A * 12/1985 Okamoto et al. ............ 123/564
4,665,704 A *  5/1987 Hartwig ....................... 60/597
(Continued)

FOREIGN PATENT DOCUMENTS

EP  0 352 064 A1  1/1990
EP  1 927 739 A1  6/2008
(Continued)

OTHER PUBLICATIONS
Japanese Patent 2008-190412 in Japanese Language and Machine Translation in English.*
(Continued)

*Primary Examiner* — Kenneth Bomberg
*Assistant Examiner* — Shafiq Mian
(74) *Attorney, Agent, or Firm* — Sterne, Kessler, Goldstein & Fox P.L.L.C.

(57) ABSTRACT

An engine provided with a variable parallel supercharging system (9) comprising a first supercharger (10) which is driven by exhaust gas which flows in a first exhaust gas route (41) and which pressurizes intake air which flows in a first intake air route (3) and also comprising a second supercharger (20) which is driven by exhaust gas which flows in a second exhaust gas route (42) and which pressurizes intake air which flows in a second intake air route (4), a supercharging pressure sensor (63) for detecting the pressure of the pressurized intake air, a first supercharger rotation sensor (61) for detecting the rotational speed of the first supercharger (10), a second supercharger rotation sensor (62) for detecting the rotational speed of the second supercharger (20), a first variable actuator (14) for adjusting the capacity of the first supercharger (10), a second variable actuator (24) for adjusting the capacity of the second supercharger (20), and a control device for controlling each of the variable actuators (14, 24). The control device controls the first variable actuator (14) based on detection signals from the supercharging pressure sensor (63) and the first supercharger rotation sensor (61) and controls the second variable actuator (24) based on detection signals from the supercharging pressure sensor (63) and the second supercharger rotation sensor (62).

10 Claims, 3 Drawing Sheets

(51) Int. Cl.
F02D 41/00 (2006.01)
F02B 37/22 (2006.01)
F02B 37/007 (2006.01)
F02B 37/24 (2006.01)
F02B 37/18 (2006.01)
F02D 23/00 (2006.01)

(56) References Cited

U.S. PATENT DOCUMENTS

| | | | |
|---|---|---|---|
| 4,730,457 A * | 3/1988 | Yamada et al. | 60/609 |
| 4,815,437 A * | 3/1989 | Regar | 123/564 |
| 5,187,935 A * | 2/1993 | Akiyama et al. | 60/602 |
| 5,408,979 A * | 4/1995 | Backlund et al. | 123/562 |
| 5,791,146 A * | 8/1998 | Dungner | 60/605.2 |
| 5,794,445 A * | 8/1998 | Dungner | 60/605.2 |
| 6,357,234 B1 * | 3/2002 | Gladden | 60/612 |
| 6,550,247 B1 | 4/2003 | Gladden | |
| 6,817,174 B1 * | 11/2004 | Igarashi et al. | 60/295 |
| 6,917,873 B2 * | 7/2005 | Itoyama | 701/108 |
| 7,089,738 B1 | 8/2006 | Boewe et al. | |
| 7,353,102 B2 * | 4/2008 | Narita et al. | 701/102 |
| 7,426,830 B2 * | 9/2008 | Schorn et al. | 60/612 |
| 8,006,495 B2 * | 8/2011 | Igarashi et al. | 60/608 |
| 8,316,642 B2 * | 11/2012 | McEwan et al. | 60/612 |
| 2002/0103593 A1 | 8/2002 | Brackney et al. | |
| 2006/0021347 A1 | 2/2006 | Sun et al. | |
| 2006/0059909 A1 * | 3/2006 | Spaeder et al. | 60/599 |
| 2007/0068158 A1 | 3/2007 | Sun et al. | |
| 2007/0151243 A1 | 7/2007 | Stewart | |

FOREIGN PATENT DOCUMENTS

| | | |
|---|---|---|
| GB | 2 406 394 | 3/2005 |
| JP | S60-178329 | 11/1985 |
| JP | 05-288111 | 11/1993 |
| JP | 08-028287 | 1/1996 |
| JP | 2008-008202 | 1/2008 |
| JP | 2008-190412 | 8/2008 |
| JP | 2008190412 * | 8/2008 |
| WO | WO2007032157 * | 3/2007 |

OTHER PUBLICATIONS

WO 2007/032157 A1 in English Language.*
English Translation of International Search Report for PCT/JP2009/066247, Japanese Patent Office, mailed Nov. 24, 2009, 2 pgs.
Supplementary European Search Report in Appl. No. EP 09 81 9080, completed Apr. 15, 2014.

* cited by examiner

ENGINE

TECHNICAL FIELD

The present invention relates to an art of control of an engine having a variable parallel supercharging system.

BACKGROUND ART

Conventionally, a supercharging system is known in which two superchargers are arranged about one engine. For example, in a parallel supercharging system, two superchargers compress intake air flowing in two intake paths. In a series supercharging system, two superchargers compress intake air flowing in one intake path. The Patent Literature 1 discloses an engine having a so-called sequential twin turbo which is a form of the series supercharging system.

A supercharger of variable capacity type is also known in which exhaust gas is introduced to a turbine constituting the supercharger while controlling flow rate suitably so as to improve supercharging efficiency. A parallel supercharging system in which two superchargers compress intake air flowing in two intake paths and at least one of the superchargers is variable capacity type is defined as a variable parallel supercharging system.

Conventionally, in control of capacity in a variable capacity type supercharger, feedback control is performed with supercharging pressure detected by a supercharging pressure sensor. However, the supercharging pressure is indirect physical quantity about the action of the supercharger and is disadvantageous because the control of capacity of the supercharger cannot be performed accurately. Especially, the variable parallel supercharging system having the variable capacity type superchargers is disadvantageous because the control of capacity cannot be performed accurately further.

Patent Literature 1: the Japanese Patent Laid Open Gazette Hei. 5-288111

DISCLOSURE OF INVENTION

Problems to be Solved by the Invention

Then, the purpose of the present invention is to provide an engine and a control method which can control accurately a variable parallel supercharging system.

Means for Solving the Problems

Explanation will be given on means of the present invention for solving the problems.

According to the first aspect of the present invention, an engine in which intake air distributed to cylinders is supplied through a first intake path and a second intake path, and exhaust gas collected from the cylinders is discharged through a first exhaust path and a second exhaust path, includes a variable parallel supercharging system comprising a first supercharger which is driven by exhaust gas flowing in a first exhaust path and pressurizes intake air flowing in a first intake path, and a second supercharger which is driven by exhaust gas flowing in a second exhaust path and pressurizes intake air flowing in a second intake air route, a supercharging pressure sensor detecting pressure of the intake air pressurized by the first supercharger and the second supercharger, a first supercharger rotation sensor detecting supercharger rotational speed of the first supercharger, a second supercharger rotation sensor detecting supercharger rotational speed of the second supercharger, a first variable actuator controlling capacity of the first supercharger, a second variable actuator controlling capacity of the second supercharger, and a control device enabling the first variable actuator and the second variable actuator to be controlled. The control device controls the first variable actuator based on detection signals from the supercharging pressure sensor and the first supercharger rotation sensor, and controls the second variable actuator based on detection signals from the supercharging pressure sensor and the second supercharger rotation sensor.

According to the second aspect of the present invention, the engine according to the first aspect further includes a bypass path connecting the part of the first exhaust path upstream the first supercharger to the part of the second exhaust path upstream the second supercharger, a bypasses flow rate control valve controlling flow rate of exhaust gas flowing in the bypass path, and a control device enabling the first variable actuator, the second variable actuator and the bypasses flow rate control valve to be controlled. The control device controls the first variable actuator based on detection signals from the supercharging pressure sensor and the first supercharger rotation sensor, controls the second variable actuator based on detection signals from the supercharging pressure sensor and the second supercharger rotation sensor, and controls the bypasses flow rate control valve based on detection signals from the supercharging pressure sensor, the first supercharger rotation sensor and the second supercharger rotation sensor.

Effect of the Invention

The present invention constructed as the above brings the following effects.

According to the first aspect of the present invention, the capacity of the supercharger is controlled while employing the supercharging pressure and the supercharger rotation speed as feedback values, whereby the variable parallel supercharging system can be controlled accurately.

According to the second aspect of the present invention, the capacity of the supercharger is controlled and the vane opening degree of the bypasses flow rate control valve is controlled while employing the supercharging pressure and the supercharger rotation speed as feedback values, whereby the variable parallel supercharging system can be controlled accurately further.

Figure 1:
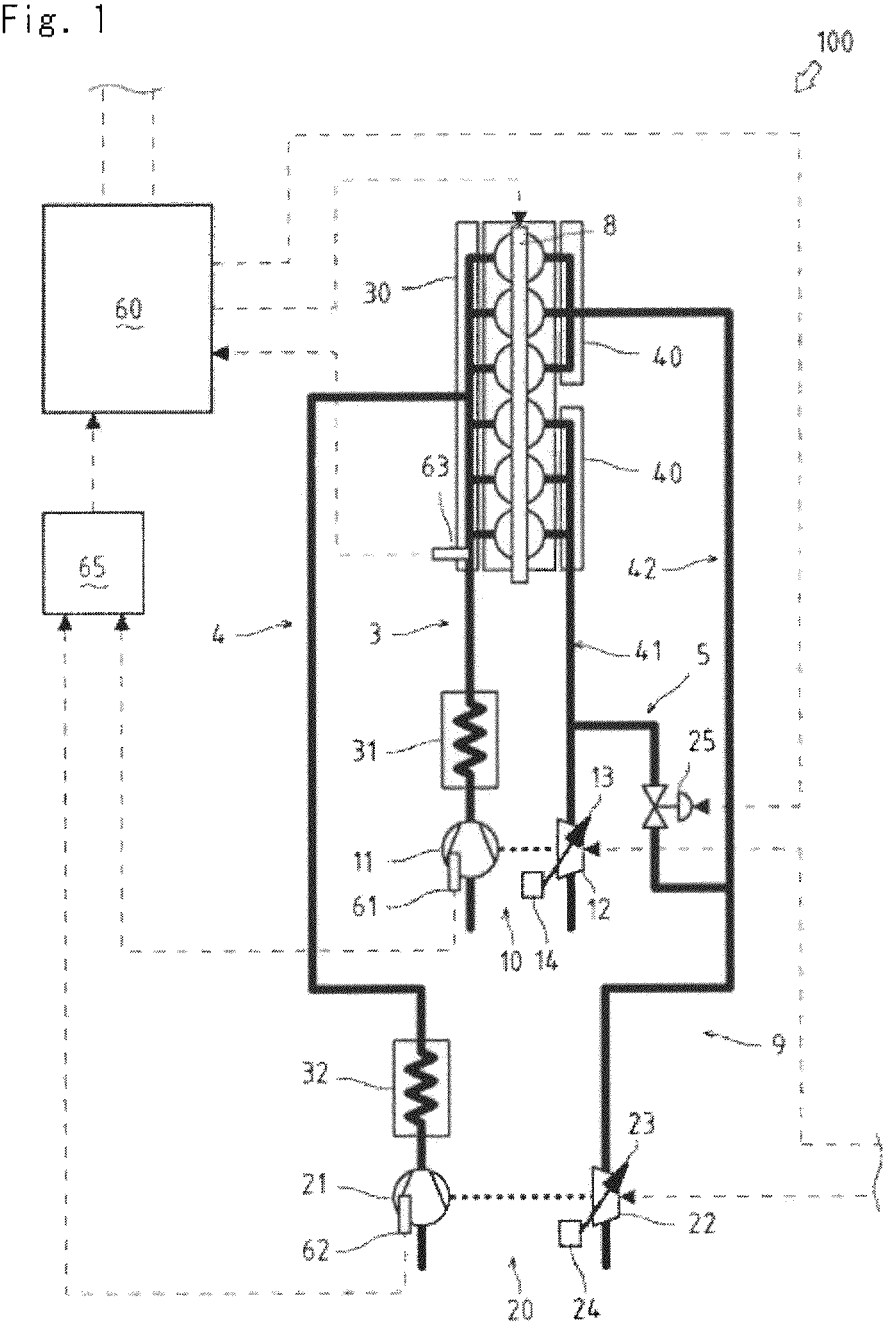
[FIG. 1] It is a schematic drawing of entire construction of an engine according to the present invention.

DESCRIPTION OF NOTATIONS 3 first intake path
4 second intake path
5 bypass path
9 variable parallel supercharging system
10 first supercharger
11 compressor
12 turbine
13 variable vane
14 first variable actuator
20 second supercharger
21 compressor
22 turbine 23 variable vane
24 second variable actuator
25 bypasses flow rate control valve
30 intake manifold
40 exhaust manifold
41 first exhaust path
42 second exhaust path
61 first supercharger rotation sensor
62 second supercharger rotation sensor
63 supercharging pressure sensor
100 engine
Bpa supercharging pressure
Bpatrg target supercharging pressure
ωctrg target supercharger rotation speed
Nta_1 first supercharger rotation speed
ωctrg_1 target first supercharger rotation speed
Nta_2 second supercharger rotation speed
ωctrg_2 target second supercharger rotation speed

THE BEST MODE FOR CARRYING OUT THE INVENTION

Next, explanation will be given on the embodiments of the present invention.

Figure 2:
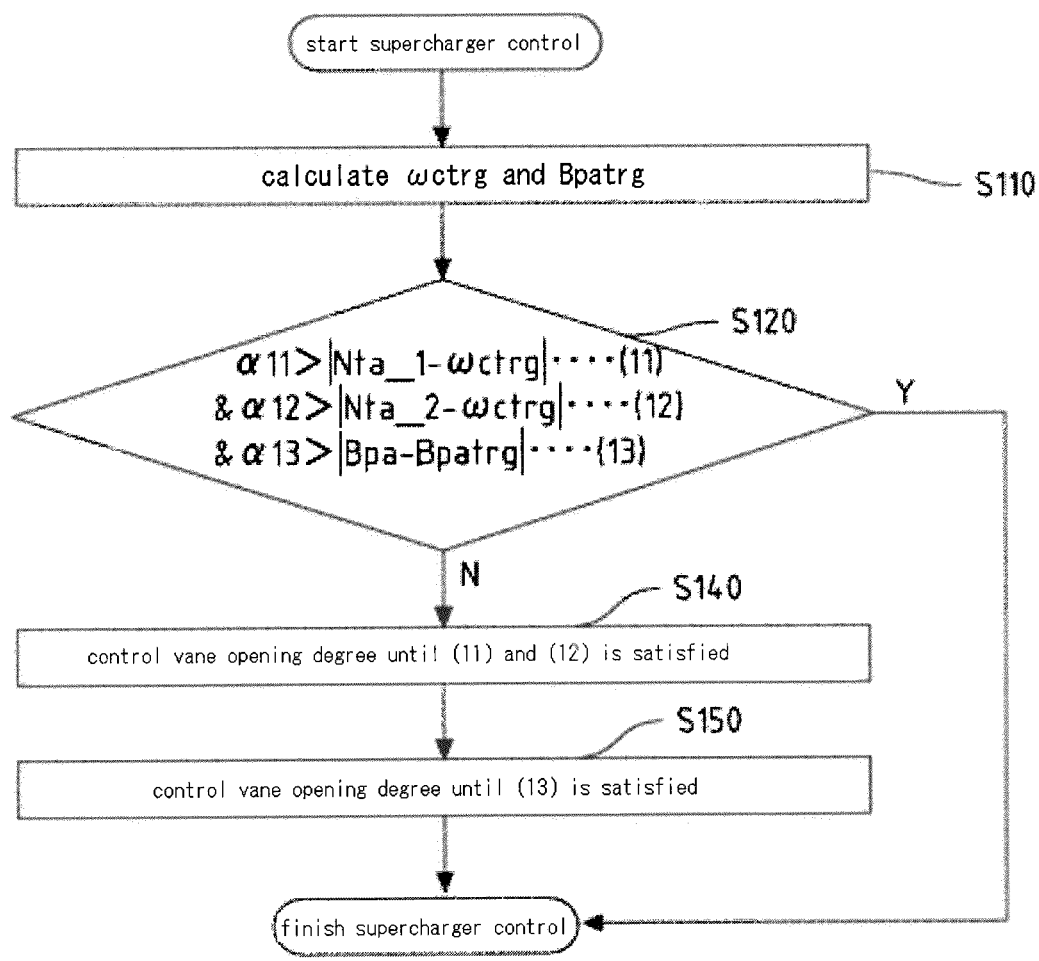
[FIG. 2] It is a flow chart of a control flow of the engine according to a first embodiment of the present invention.
Figure 3:
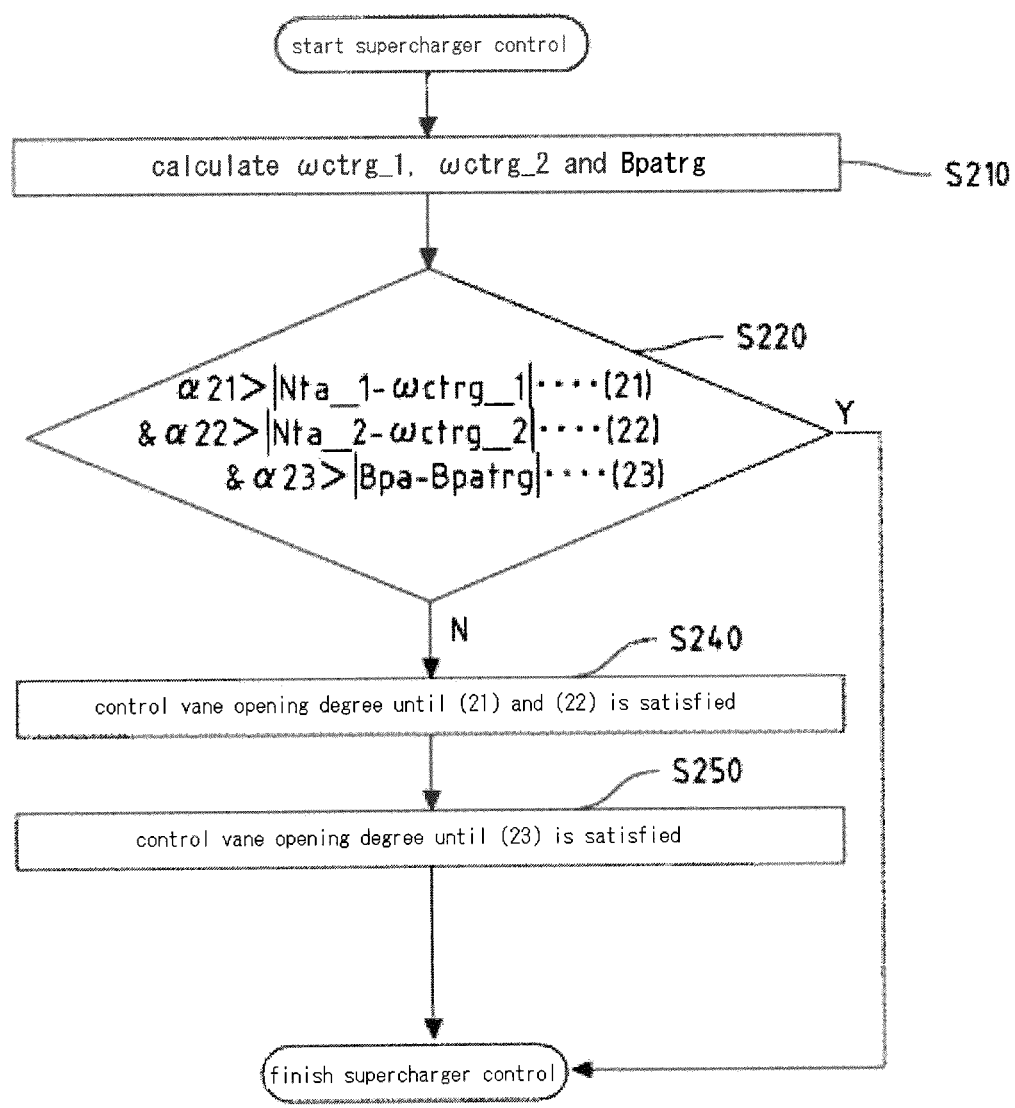
[FIG. 3] It is a flow chart of a control flow of the engine according to a second embodiment of the present invention.

FIG. 1 is a schematic drawing of entire construction of an engine 100 according to the present invention. FIG. 2 is a flow chart of a control flow of the engine 100 according to a first embodiment of the present invention. FIG. 3 is a flow chart of a control flow of the engine 100 according to a second embodiment of the present invention.

Firstly, explanation will be given on the engine 100 according to the present invention. The engine 100 according to the present invention is a direct injection type 6-cylindered engine and mainly includes an intake manifold 30 to which a first intake path 3 and a second intake path 4 are connected, two exhaust manifolds 40 to which a first exhaust path 41 and a second exhaust path 42 are connected, and a common rail type fuel injection device (hereinafter, referred to as fuel injection device) 8.

The engine 100 includes a variable parallel supercharging system 9 having a first supercharger 10 and a second supercharger 20. The first supercharger 10 includes a turbine 12 rotationally driven by receiving exhaust gas flowing in the first exhaust path 41 and a compressor 11 rotationally driven by the turbine 12 so as to compress intake air flowing in the first intake path 3. The second supercharger 20 includes a turbine 22 rotationally driven by receiving exhaust gas flowing in the second exhaust path 42 and a compressor 21 rotationally driven by the turbine 22 so as to compress intake air flowing in the second intake path 4. The capacity of the second supercharger 20 is larger than that of the first supercharger 10 at the normal operation state.

Each of the first supercharger 10 and the second supercharger 20 is a variable capacity type supercharger. The first supercharger 10 has a first variable actuator 14, and the second supercharger 20 has a second variable actuator 24. The first variable actuator 14 controls vane opening degree of a variable vane 13 provided in the turbine 12 of the first supercharger 10. The second variable actuator 24 controls vane opening degree of a variable vane 23 provided in the turbine 22 of the second supercharger 20.

The first supercharger 10 and the second supercharger 20 control the vane opening degree by the variable actuators 14 and 24. Accordingly, flow rate of exhaust gas introduced into the turbines 12 and 22 can be controlled suitably, whereby supercharging efficiency is improved in wide drive range.

In the variable parallel supercharging system 9 of the engine 100 according to the present invention, the capacity of the second supercharger 20 is larger than that of the first supercharger 10 at the normal operation state. However, by controlling the vane opening degree of the variable vane 23 so as to reduce the capacity, the second supercharger 20 acts as a supercharger whose capacity is the same as that of the first supercharger 10.

In the first intake path 3, from the upstream side toward the intake manifold 30, the compressor 11 of the first supercharger 10 and an intercooler 31 cooling intake air compressed in the compressor 11 are arranged. In the second intake path 4, from the upstream side toward the intake manifold 30, the compressor 21 of the second supercharger 20 and an intercooler 32 cooling intake air compressed in the compressor 21 are arranged.

Each of the exhaust manifolds 40 discharges exhaust gas from the three cylinders. In the first exhaust path 41, from one of the exhaust manifolds 40 toward the downstream side, the turbine 12 of the first supercharger 10 is arranged. In the second exhaust path 42, from the other exhaust manifold 40 toward the downstream side, the turbine 22 of the second supercharger 20 is arranged.

A bypass path 5 connects the part of the first exhaust path 41 upstream the turbine 12 of the first supercharger 10 to the part of the second exhaust path 42 upstream the turbine 22 of the second supercharger 20. A bypasses flow rate control valve 25 which controls flow rate of exhaust gas passing through the bypass path 5 is provided in the bypass path 5.

A control device 60 mainly includes a central processing unit and a storage device. The control device 60 is electrically connected through an amplifier 65 to a first supercharger rotation sensor 61 provided in the first supercharger 10 and a second supercharger rotation sensor 62 provided in the second supercharger 20. The control device 60 is electrically connected to a supercharging pressure sensor 63 provided in the intake manifold 30 and the other sensors, forms control signals based on electric signals from the sensors, and outputs the control signals to the first variable actuator 14, the second variable actuator 24 and the like. Hereinafter, the control of the variable vane 13 of the first supercharger 10, the control of the variable vane 23 of the second supercharger 20, and the control of valve opening degree of the bypasses flow rate control valve 25 by the control device 60 are defined as supercharger control.

[Embodiment 1]

Explanation will be given on the supercharger control of the engine 100 according to the first embodiment of the present invention referring to FIG. 2. The control device 60 controls the variable vane 13 of the first supercharger 10 and the variable vane 23 of the second supercharger 20 so as to make the first supercharger 10 and the second supercharger 20 have the same capacity and to enable the first supercharger 10 and the second supercharger 20 to compress intake air the most efficiently in the case that the driving state of the engine 100 is at low speed rotation and low load state, that is, at low output driving state.

Firstly, the control device 60 calculates a target supercharger rotation speed ωctrg and a target supercharging pressure Bpatrg (S110).

The target supercharger rotation speed ωctrg is the rotation speed of the compressors 11 and 12 at which intake air can be compressed the most efficiently in the first supercharger 10 and the second supercharger 20, and is calculated based on the target supercharging pressure Bpatrg, a map stored in the storage device of the control device 60 and the like.

The target supercharging pressure Bpatrg is the supercharging pressure at which fuel combustion following the driving state of the engine 100 can be optimized, and is calculated based on a map stored in the storage device of the control device 60 and the like.

The control device 60 judges as condition (11) whether the absolute value of the difference between a first supercharger rotation speed Nta_1 detected by the first supercharger rotation sensor 61 and the target supercharger rotation speed ωctrg is smaller than a predetermined value α11, judges as condition (12) whether the absolute value of the difference between a second supercharger rotation speed Nta_2 detected by the second supercharger rotation sensor 62 and the target supercharger rotation speed ωctrg is smaller than a predetermined value α12, and judges as condition (13) whether a supercharging pressure Bpa detected by a supercharging pressure sensor 63 and the target supercharging pressure Bpatrg is smaller than a predetermined value α13 (S120).

In the case that the conditions (11), (12) and (13) are satisfied at S120, the control device 60 judges that each of the first supercharger rotation speed Nta_1 and the second supercharger rotation speed Nta_2 is the supercharger rotation speed of the variable parallel supercharging system 9 at which intake air can be compressed the most efficiently and the supercharging pressure Bpa is the most suitable supercharging pressure to the fuel combustion.

On the other hand, in the case that the condition (11), (12) or (13) is not satisfied at S120, the control device 60 judges that the first supercharger rotation speed Nta_1 or the second supercharger rotation speed Nta_2 is not the supercharger rotation speed of the variable parallel supercharging system 9 at which intake air can be compressed the most efficiently or that the supercharging pressure Bpa is not the most suitable supercharging pressure to the fuel combustion.

Then, the control device 60 controls the variable vane 13 of the first supercharger 10 so as to control the vane opening degree until the condition (11) is satisfied, and controls the variable vane 23 of the second supercharger 20 so as to control the vane opening degree until the condition (12) is satisfied (S140). Subsequently, the control device 60 controls the variable vane 13 of the first supercharger 10 and the variable vane 23 of the second supercharger 20 so as to control the vane opening degree until the condition (13) is satisfied (S150).

As mentioned above, the variable vane 13 of the first supercharger 10 and the variable vane 23 of the second supercharger 20 are controlled while employing the first supercharger rotation speed Nta_1, the second supercharger rotation speed Nta_2 and the supercharging pressure Bpa as feedback values, whereby the variable parallel supercharging system 9 can be controlled accurately.

[Embodiment 2]

Explanation will be given on the supercharger control of the engine 100 according to the second embodiment of the present invention referring to FIG. 3. In the case that the driving state of the engine 100 shifts from the low output driving state to the high output driving state and the first supercharger 10 reaches the maximum of the supercharger rotation speed at which intake air can be compressed efficiency, the control device 60 controls valve opening degree of the bypasses flow rate control valve 25 so as to realize the most suitable supercharging pressure for fuel combustion while the second supercharger 20 is set at the supercharger rotation speed at which intake air can be compressed efficiency.

Firstly, the control device 60 calculates a target first supercharger rotation speed ωctrg_1, a target second supercharger rotation speed ωctrg_2 and a target supercharging pressure Bpatrg (S210).

The target first supercharger rotation speed ωctrg_1 is the rotation speed of the compressor 11 at which intake air can be compressed the most efficiently in the first supercharger 10, and is calculated based on the target supercharging pressure Bpatrg, a map stored in the storage device of the control device 60 and the like.

The target second supercharger rotation speed ωctrg_2 is the rotation speed of the compressor 21 at which intake air can be compressed the most efficiently in the second supercharger 20, and is calculated based on the target supercharging pressure Bpatrg, a map stored in the storage device of the control device 60 and the like.

The target supercharging pressure Bpatrg is the supercharging pressure at which fuel combustion following the driving state of the engine 100 can be optimized, and is calculated based on a map stored in the storage device of the control device 60 and the like.

The control device 60 judges as condition (21) whether the absolute value of the difference between a first supercharger rotation speed Nta_1 detected by the first supercharger rotation sensor 61 and target first supercharger rotation speed ωctrg_1 is smaller than a predetermined value α21, judges as condition (22) whether the absolute value of the difference between a second supercharger rotation speed Nta_2 detected by the second supercharger rotation sensor 62 and target second supercharger rotation speed ωctrg_2 is smaller than a predetermined value α22, and judges as condition (23) whether a supercharging pressure Bpa detected by the supercharging pressure sensor 63 and the target supercharging pressure Bpatrg is smaller than a predetermined value α23 (S220).

In the case that the conditions (21), (22) and (23) are satisfied at S220, the control device 60 judges that each of the first supercharger rotation speed Nta_1 and the second supercharger rotation speed Nta_2 is the supercharger rotation speed at which intake air can be compressed the most efficiently in the variable parallel supercharging system 9 and the supercharging pressure Bpa is the most suitable supercharging pressure to the fuel combustion.

On the other hand, in the case that the condition (21), (22) or (23) is not satisfied at S220, the control device 60 judges that the first supercharger rotation speed Nta_1 or the second supercharger rotation speed Nta_2 is not the supercharger rotation speed of the variable parallel supercharging system 9 at which intake air can be compressed the most efficiently or that the supercharging pressure Bpa is not the most suitable supercharging pressure to the fuel combustion.

Then, the control device 60 controls the bypasses flow rate control valve 25 so as to control the vane opening degree until the conditions (21) and (22) are satisfied (S240). Subsequently, the control device 60 controls the bypasses flow rate control valve 25 so as to control the vane opening degree until the condition (23) is satisfied (S250).

As mentioned above, the variable vane 13 of the first supercharger 10, the variable vane 23 of the second supercharger 20 and the bypasses flow rate control valve 25 are controlled while employing the first supercharger rotation speed Nta_1, the second supercharger rotation speed Nta_2 and the supercharging pressure Bpa as feedback values, whereby the variable parallel supercharging system 9 can be controlled accurately further.

The first supercharger rotation speed Nta_1 directly concerned with the action of the first supercharger 10 and the second supercharger rotation speed Nta_2 directly concerned with the action of the second supercharger 20 are employed as the feedback values, whereby the action can be switched accurately between two action patterns, i.e., the pattern that the first supercharger 10 and the second supercharger 20 having different capacities are actuated as having the same capacity and the pattern that the first supercharger 10 and the second supercharger 20 are actuated as having different capacities corresponding to the driving state of the engine 100.

In the case that the supercharger rotation speed is larger than the maximum value of the first supercharger 10 having small capacity, the overspeed of the first supercharger 10 can be prevented by increasing the valve opening degree of the bypasses flow rate control valve 25. Furthermore, by employing the supercharger rotation speed as the feedback value, whereby accurate control can be performed without considering dispersion of products of the first supercharger 10 and the second supercharger 20.

INDUSTRIAL APPLICABILITY

The present invention can be employed for an engine having a variable parallel supercharging system.

The invention claimed is:

1. An engine in which intake air distributed to cylinders is supplied through a first intake path and a second intake path, and exhaust gas collected from the cylinders is discharged through a first exhaust path and a second exhaust path, comprising:
a variable parallel supercharging system comprising a first supercharger which is driven by exhaust gas flowing in the first exhaust path and pressurizes intake air flowing in the first intake path, and a second supercharger which is driven by exhaust gas flowing in the second exhaust path and pressurizes intake air flowing in the second intake path;
a supercharging pressure sensor detecting pressure of the intake air pressurized by the first supercharger and the second supercharger;
a first supercharger rotation sensor detecting supercharger rotational speed of the first supercharger:
a second supercharger rotation sensor detecting supercharger rotational speed of the second supercharger;
a first variable actuator controlling capacity of the first supercharger;
a second variable actuator controlling capacity of the second supercharger;
a control device comprising a central processing unit and memory, the control device configured to enable the first variable actuator and the second variable actuator to be controlled,
wherein the control device is configured to control the first variable actuator based on detection signals from the supercharging pressure sensor, the second supercharger rotation sensor, and the first supercharger rotation sensor, and is configured to control the second variable actuator based on detection signals from the supercharging pressure sensor, the first supercharger rotation sensor, and the second supercharger rotation sensor,
wherein the control device is configured to control the first variable actuator until a first condition is satisfied, wherein the control device is configured to control the second variable actuator until a second condition is satisfied, and wherein the control device is configured to control the first variable actuator and the second variable actuator until a third condition is satisfied.

2. The engine according to claim 1, further comprising:
a bypass path connecting the part of the first exhaust path upstream the first supercharger to the part of the second exhaust path upstream the second supercharger;
a bypasses flow rate control valve controlling flow rate of exhaust gas flowing in the bypass path; and
a control device configured to enable the first variable actuator, the second variable actuator and the bypasses flow rate control valve to be controlled,
wherein the control device is configured to control the first variable actuator based on detection signals from the supercharging pressure sensor and the first supercharger rotation sensor, is configured to control the second variable actuator based on detection signals from the supercharging pressure sensor and the second supercharger rotation sensor, and is configured to control the bypass flow rate control valve based on detection signals from the supercharging pressure sensor, the first supercharger rotation sensor and the second supercharger rotation sensor.

3. The engine according to claim 1, wherein the capacity of the first supercharger and the second supercharger are different when at an operation state.

4. The engine according to claim 1, wherein the second supercharger has greater capacity than the first supercharger at an operation state, and
wherein the control device is configured to control the capacity of the second supercharger based on detection signals from the supercharging pressure sensor and the second supercharger rotation sensor by controlling the second variable actuator such that the second supercharger is configured to perform the same as the first supercharger.

5. The engine according to claim 1, wherein the first condition is satisfied when an absolute value of a difference between a first supercharger rotation speed detected by the first supercharger rotation sensor and a target supercharger rotation speed is smaller than a predetermined value.

6. The engine according to claim 1, wherein the second condition is satisfied when an absolute value of a difference between a second supercharger rotation speed detected by the second supercharger rotation sensor and a target supercharger rotation speed is smaller than a predetermined value.

7. The engine according to claim 1, wherein the third condition is satisfied when a supercharging pressure detected by the supercharging pressure and a target supercharging pressure is smaller than a predetermined value.

8. The engine according to claim 1, wherein the control device is configured to control the first variable actuator and the second variable actuator until the first condition and the third condition are satisfied at the same time.

9. The engine according to claim 1, wherein the control device is configured to control the first variable actuator and the second variable actuator until the second condition and the third condition are satisfied at the same time.

10. The engine according to claim 1, wherein the control device is configured to control the first variable actuator and the second variable actuator until the first condition, the second condition, and the third condition are satisfied at the same time.

* * * * *